United States Patent [19]

Morris

[11] Patent Number: 5,103,860

[45] Date of Patent: Apr. 14, 1992

[54] GAS CYLINDER SAFETY VALVE

[76] Inventor: Arnold D. Morris, 456 Group St., Braintree, Mass. 02184

[21] Appl. No.: 572,528

[22] Filed: Aug. 23, 1990

[51] Int. Cl.[5] .................. F16K 17/164; F16K 17/168
[52] U.S. Cl. ...................................... 137/460; 137/517
[58] Field of Search ............... 137/460, 517, 901, 498

[56] References Cited

U.S. PATENT DOCUMENTS

| 1,625,044 | 12/1925 | McKeown |  |
|---|---|---|---|
| 1,787,445 | 12/1927 | Gade |  |
| 2,041,198 | 5/1936 | McLean | 137/517 |
| 2,319,485 | 9/1940 | Wyckoff | 251/132 |
| 2,367,662 | 1/1945 | Baxter et al. | 137/517 |
| 2,388,710 | 11/1945 | Sanford | 277/27 |
| 2,461,940 | 2/1949 | Sundstrom | 284/19 |
| 2,796,882 | 12/1953 | Bradley | 137/329.4 |
| 3,592,219 | 5/1969 | Glese | 137/242 |
| 3,820,565 | 6/1974 | Durbin | 137/517 X |
| 4,067,354 | 1/1978 | St. Clair | 137/329.4 |
| 4,562,852 | 1/1986 | Britt | 137/901 X |
| 4,606,367 | 8/1986 | Britt | 137/15 |

FOREIGN PATENT DOCUMENTS 1016326  1/1966  United Kingdom ............... 137/901

Primary Examiner—Stephen M. Hepperle
Attorney, Agent, or Firm—Stanton E. Collier; Donald J. Singer

[57] ABSTRACT

A safety valve is adapted to fit into the stem of a conventional service valve of a high pressure gas cylinder to prevent the escape of gas when the external part of the service valve is broken off. A plunger within the safety valve is biased away from a valve seat until a high pressure differential exists within the flow channels.

1 Claim, 1 Drawing Sheet

GAS CYLINDER SAFETY VALVE

STATEMENT OF GOVERNMENT INTEREST

The invention described herein may be manufactured and used by or for the Government for governmental purposes without the payment of any royalty thereon.

BACKGROUND OF THE INVENTION

The present invention relates to gas cylinders, and, more particularly, relates to safety valves that may be installed therein.

Gas cylinders typically hold under high pressure both toxic and non-toxic gases. These cylinders have a threaded port for the insertion of a conventional service valve for inputting and outputting gases. The service valve also has a pressure relief valve therein. The service valve is typically made of brass and has a threaded stem for insertion into the threaded port of the cylinder. A steel cap is typically placed over the service valve and threaded onto the outside of the bonnet for protecting the service valve from damage. Still the service valve is subject to damage when the cap is not screwed on, left off during use or otherwise exposed by negligence. If the service valve is broken off, the gas inside the cylinder can escape turning the cylinder into a rocket and possibly releasing hazardous gases at the same time.

U.S. Pat. No. 4,606,367 discloses a safety and service valve. As noted in this patent, a mechanical member in the upper body of the special valve extends into a ball chamber and constantly biases a ball to allow a clear flow path. If the upper body is broken away removing the mechanical member, the ball is spring biased into a closed position to block the flow path. The ball chamber is an integral part of the valve stem. Although this special valve serves the purpose for which intended, many gas cylinders in being do not have this special valve safety feature U.S. Pat. No. 1,625,044 discloses a valve rod with a handle thereon which contacts a ball valve which is normally biased closed. Upon breaking of the upper valve body, the ball valve would close preventing a gas leak. The ball valve is a part of the filler plug which goes into the bonnet of the cylinder. A discharge manifold is placed into the filler plug hole during use or recharge. The manifold and filler plug are separable and are only attached together when the cylinder is actually in use. This feature does reduce the chance of damage to the manifold during such use.

Thus, there is a need for a safety valve for conventional gas cylinders having a service valve thereon without a safety valve being an integral part thereof.

SUMMARY OF THE INVENTION

The present invention is a safety valve that is adapted for use on a conventional service valve. The service valve stem is threaded and is screwed into the bonnet of a gas cylinder.

The safety valve of the present invention has a housing with a threaded top. The service valve stem is threaded to accept the threaded top of the safety valve of the present invention. Inside the housing is a chamber that is in fluid communication with the gas in the gas cylinder and a gas flow channel of the top. A valve seat is positioned between the chamber in the housing and the gas flow channel of the top. A plunger is positioned within the chamber and is biased away from the gas flow channel by a spring. The top of the plunger has a tapered part forming a valve which can be seated in the valve seat of the housing. If a sufficient gas flow occurs, i.e., a difference in pressure between the cylinder and the outside, this will force the plunger into the valve seat blocking the flow until relieved.

It is therefore one object of the present invention to provide a safety valve that is easily adapted to the service valve used in conventional gas cylinders.

Another object of the present invention is to provide a gas cylinder with a safety valve therein that functions independent of a device attached to the service valve or the service valve itself.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
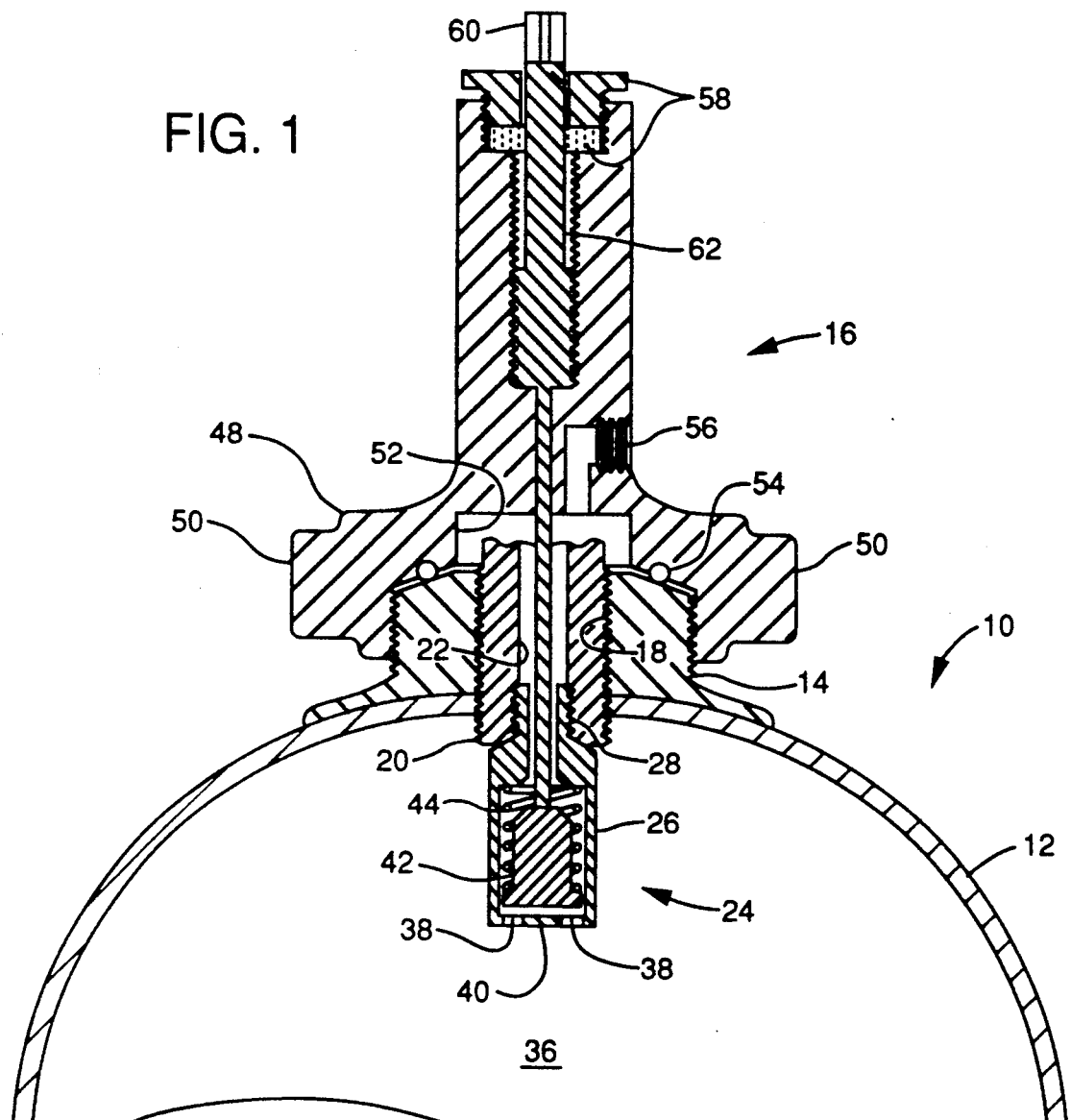
FIG. 1 is a cross section of a gas cylinder with the invention therein with a gas recovery apparatus thereon.
Figure 2:
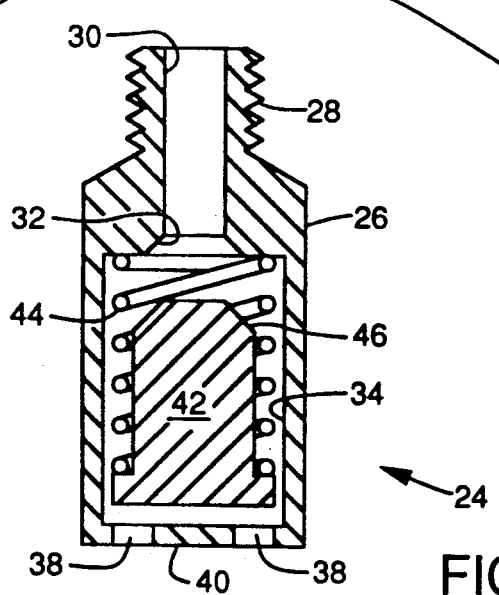
FIG. 2 is a cross section of the safety valve of the present invention.

Referring to FIG. 1, a high pressure gas cylinder 10 of conventional design has a metal wall 12 with a neck or bonnet 14 attached thereon. The bonnet 14 is threaded on the outside for the attachment of a protective cap, not shown; in FIG. 1 a gas recovery apparatus 16 is threaded thereon instead. The bonnet 14 has a threaded throat 18.

A service valve having a shut-off and a pressure relief is typically attached in the bonnet 14 by a threaded stem 20 which is shown in FIG. 1 as broken at the top. The stem 20 has a gas channel 22 therein.

A safety valve 24 adaptable to a conventional service valve is shown in the Figures. The safety valve 24 has a housing 26 with a threaded top 28. The gas channel 22 is threaded to accept the threaded top 28 of the safety valve 24. A gas flow channel 30 through the top 28 meets a valve seat 32 in the housing 26. A chamber 34 in the housing 26 is in fluid communication with the gas flow channel 30 by the valve seat 32. The chamber 34 is also in fluid communications with a gas chamber 36 of the gas cylinder 10 by means of at least one gas port 38 in a bottom 40 of the safety valve 24.

Inside and filling substantially chamber 34 is a plunger 42 that is biased by a spring 44 away from the valve seat 32. The plunger 42 has a tapered top 46 that fits closely into the valve seat 32 when so urged. The spring 44 is selected such that in normal operation gas flowing past the plunger 42 by the walls of the chamber 34 will not cause the plunger 42 to be pushed into the seat 32, but if the top of the service valve is broken off, the gas within the cylinder 10 will rush to escape so causing the plunger 42 to block the flow channel 30. This condition will remain until the plunger 42 is moved away from the seat 32.

In order to do this, the gas recovery apparatus 16 is screwed onto the bonnet 14 as shown in FIG. 1.

The gas recovery apparatus 16 has a housing 48 with ears 50 for turning it onto the bonnet 14. The gas recovery apparatus has a bonnet chamber 52, an O-ring 54 for sealing the housing 48 to the top of the bonnet 14, a gas recovery port 56, a packing gland 58, a handle 60 and a rod 62.

When the service valve breaks and the safety valve plunger 42 operates to cut off the gas flow from the cylinder 12, the recovery apparatus 16 may be used to safely empty the cylinder 12. It is attached to the cylinder 12 by screwing it onto the bonnet 14 using the ears 50 to tighten it against the 0-ring 54. A recovery line, not shown, is attached to the recovery port 56 and the rod 62 is then screwed down by turning the handle 60. This forces the safety valve plunger 42 open and allows the gas to flow through the chamber 34 and out the recovery port 56.

Clearly, many modifications and variations of the present invention are possible in light of the above teachings and it is therefore understood, that within the inventive scope of the inventive concept, the invention may be practiced otherwise than specifically claimed.

What is claimed is:

1. A gas cylinder safety apparatus for a gas cylinder, the gas cylinder being a container with a hole in a top, a bonnet with a threaded hole therethrough is fixedly attached to the container with the bonnet hole aligned with the container hole, the container being fillable with a liquid under pressure, said gas cylinder apparatus comprising:

a service valve, said service valve comprising:
  a means for releasably controlling the flow of pressurized gas from the gas cylinder, said means being a gas valve in said service valve; and
  a stem, said stem attached to said means, said stem being threaded for insertion into the threaded hole of the bonnet, said stem having a gas flow channel therethrough, said means for releasably controlling the flow being on the outside of the gas cylinder when said stem is inserted into the bonnet hole, and a removably attachable safety valve, said removably attachable safety valve is for insertion into an end of said stem of said service valve, said safety valve being positioned totally inside of the gas cylinder so as to be protected from external damage to the service valve, said removably attachable safety valve comprising:

a housing, said housing having a top being insertable into said gas flow channel of said stem, the top having a gas flow channel therein aligned with the gas flow channel of said stem, said housing having a valve seat therein, a chamber, and at least one gas port in a bottom of said housing, gas from the gas cylinder being able to flow through the gas port, through the chamber, through the valve seat and through the gas flow channel, said housing having an outer diameter less than the diameter of the bonnet hole;

a plunger, said plunger being translatable within the chamber, said plunger substantially occupying the chamber and having a tapered top that closely fit within the valve seat, the gas ports being located in the bottom of the chamber away from the tapered top of said plunger, and a spring, said spring biasing said plunger away from the valve seat toward the gas ports, whereby if a sufficient gas flow occurs past said plunger upon the breakage of said means for releasably controlling from said service valve, said plunger shall overcome the bias of said spring to translate through the chamber so the top of said plunger its closely within the valve seat to block the flow of gas, said plunger remaining so positioned until the plunger is positioned away from the valve seat, whereby if said means for releasably controlling is broken from said stem, said means being located on the outside of the gas cylinder, said safety valve being not damaged prevents the unwanted flow of pressurized gas from the gas cylinder, said safety valve may be removed from said stem and placed upon a new service valve after damage to the previous service valve.

* * * * *